US009587630B2

(12) United States Patent
Goldstein

(10) Patent No.: US 9,587,630 B2
(45) Date of Patent: Mar. 7, 2017

(54) ROTOR KITE WIND ENERGY SYSTEM AND MORE

(71) Applicant: Leonid Goldstein, Austin, TX (US)

(72) Inventor: Leonid Goldstein, Austin, TX (US)

( * ) Notice: Subject to any disclaimer, the term of this patent is extended or adjusted under 35 U.S.C. 154(b) by 132 days.

(21) Appl. No.: 14/666,347

(22) Filed: Mar. 24, 2015

(65) Prior Publication Data
US 2015/0275861 A1 Oct. 1, 2015

Related U.S. Application Data

(60) Provisional application No. 61/973,214, filed on Mar. 31, 2014, provisional application No. 61/975,879, filed on Apr. 6, 2014, provisional application No. 61/981,288, filed on Apr. 18, 2014.

(51) Int. Cl.
F03D 9/00 (2016.01)
B64B 1/50 (2006.01)
B64C 31/06 (2006.01)
B64C 39/02 (2006.01)
F03D 7/02 (2006.01)
F03D 5/00 (2006.01)

(52) U.S. Cl.
CPC ............... F03D 9/002 (2013.01); B64B 1/50 (2013.01); B64C 31/06 (2013.01); B64C 39/022 (2013.01); F03D 5/00 (2013.01); F03D 7/02 (2013.01); F05B 2240/917 (2013.01); F05B 2240/921 (2013.01); F05B 2240/922 (2013.01); Y02E 10/70 (2013.01); Y02E 10/723 (2013.01); Y02E 10/725 (2013.01); Y02E 10/728 (2013.01)

(58) Field of Classification Search
CPC .......... F05B 2240/921; F05B 2240/917; F05B 2240/922; Y02E 10/70; Y02E 10/725; Y02E 10/728; Y02E 10/723; F03D 9/02; F03D 5/00; F03D 7/02; B64B 1/50; B64C 31/06
See application file for complete search history.

(56) References Cited

U.S. PATENT DOCUMENTS

| 4,685,642 | A | | 8/1987 | Schloss | |
|---|---|---|---|---|---|
| 5,435,259 | A | * | 7/1995 | Labrador | ............... B01D 61/10 114/39.31 |
| 7,317,261 | B2 | * | 1/2008 | Rolt | ...................... B64C 39/022 244/24 |
| 8,113,777 | B2 | | 2/2012 | Vergnano | |
| 8,247,912 | B2 | * | 8/2012 | Da Costa Duarte Pardal | ....................... F03D 5/00 290/44 |
| 8,405,244 | B2 | | 3/2013 | Zhang et al. | |
| 8,421,257 | B2 | | 4/2013 | Chernyshov | |
| 8,446,034 | B1 | | 5/2013 | Stevens | |
| 9,080,550 | B2 | * | 7/2015 | Goldstein | ............... F03D 9/002 |
| 2003/0066934 | A1 | * | 4/2003 | Bolonkin | .................. F03D 5/00 244/153 R |
| 2010/0230546 | A1 | * | 9/2010 | Bevirt | ....................... F03D 5/00 244/175 |
| 2011/0101692 | A1 | | 5/2011 | Bilaniuk | |
| 2012/0086210 | A1 | * | 4/2012 | Gray | ........................ F03D 5/00 290/55 |

(Continued)

Primary Examiner — Michael Zarroli

(57) ABSTRACT

An airborne wind energy system with a rotational wing, comprising at least two airfoil blades of rigid, soft or mixed type, with appropriate controls, with a launch/landing perch and/or lighter than air balloon. An AWES blade, getting wider and thicker toward the external tip. A method of launching a pair of airborne wings.

5 Claims, 6 Drawing Sheets

(56) References Cited

U.S. PATENT DOCUMENTS

| | | | | |
|---|---|---|---|---|
| 2012/0248770 A1* | 10/2012 | Byun | ................... | F03D 1/025 |
| | | | | 290/44 |
| 2015/0008678 A1* | 1/2015 | Goldstein | ................ | F03D 5/02 |
| | | | | 290/55 |
| 2015/0097086 A1* | 4/2015 | Schaefer | ............... | B64C 39/022 |
| | | | | 244/175 |

* cited by examiner

ROTOR KITE WIND ENERGY SYSTEM AND MORE

CROSS REFERENCE TO RELATED APPLICATIONS

This application claims the benefit of priority of the U.S. Provisional Applications No. 61/973,214, filed 31 Mar. 2014, Ser. No. 61/975,879, filed 6 Apr. 2014 and No. 61/981,288, filed 18 Apr. 2014, by the same inventor as herein, the entire disclosure of which is incorporated herein by reference.

BACKGROUND OF THE INVENTION

This invention is generally directed to airborne wind energy conversion systems and methods. Airborne wind energy conversion systems (AWES or AWECS) have been seriously considered for producing electrical power and other industrial purposes since 1970's. Nevertheless, multiple technical obstacles prevented development and commercial deployment of such systems. As with the aircraft, one way of classifying AWES is into a fixed wing and a rotary wing families. Most of the aspects of this invention relate to the rotary wing family.

U.S. Pat. No. 8,113,777 by Gianni Vergnano discusses a number of such systems, used either for ship traction or power generation. Unfortunately, he addressed neither the issues of the flight stability and control, nor efficient conversion of the harvested energy into electrical energy, thus rendering the discussion fruitless.

U.S. Pat. No. 8,421,257 by Dimitri Chernyshov discusses a more sophisticated device. Nevertheless, the discussed device is still not efficient enough because it is too heavy, wastes too much energy just to remain in the air and has to land when the wind is too weak.

Thus, there is still need for a cost efficient AWES and devices and methods thereof.

SUMMARY OF THE INVENTION

This invention is generally directed to airborne wind energy conversion systems and methods.

In the term "generator on the ground", the ground includes both land and water surface and constructions built on them. The "rotational element" below can be a sprocket, a drum, a sheave, a pulley, a gear or similar.

One embodiment of the invention is a wind energy conversion device, comprising: an airborne rotary wing, adapted to harvest wind energy; the rotary wing comprising at least two similar airfoil blades; an electrical generator on the ground, comprising a rotor and a stator; a rotational element on the ground, rotationally coupled to the rotor of the generator; a belt, coupled to the rotary wing and engaging the rotational element on the ground; the belt adapted to transfer mechanical energy, harvested by the airborne rotary wing, to the rotational element. The device may be equipped with a lighter than air balloon, coupled to or integral with the rotary wing in such a way as not to interfere with the rotation of the rotary wing.

The device may further comprise a control subsystem, including at least one microprocessor, plurality of sensors and plurality of actuators, carried by the airborne rotary wing. The blades may be spaced at some distance from the center of the rotary wing. Each blade may capable of slowly rotating around its lateral axis and comprise an elevator for changing angle of attack of the blade. The device may comprise a perch (on the ground) for the rotary wing at rest, the perch having a rotationally symmetrical nest, the rotary wing having a matching lug and the rotary wing capable of rotating while the lug and the nest are mated. In further modification at least one suspension line may be attached to each blade with the second end of the suspension line coupled to the belt (or to its extension on its airborne end).

Another embodiment of the invention is a wind energy conversion system, comprising: an airborne rotary wing, adapted to harvest wind energy; a gas or water pump on the ground; a tether, coupled to the airborne rotary wing and to the working body of the gas or water pump on the ground, wherein the tether is adapted to transfer the harvested energy to the gas or water pump.

The examples of the working body of the gas or water pump are piston, plunger, turbine, impeller, screw and vanes. The air or water pump may be a part of an energy storage system or an industrial installation, other than a power plant.

Another embodiment of the invention is a method of wind energy conversion, comprising steps of: raising a rotary wing into air; using the rotary wing to harvest wind energy; providing an electrical generator on the ground, comprising a rotor and a stator; providing a rotational element on the ground, rotationally coupled to the rotor of the generator; providing a motor on the ground, rotationally coupled to the rotational element; providing a tether, coupled to the rotary wing and to the rotational element; alternatively transferring energy from the rotary wing to the electrical generator by action of the tether, being pulled by the rotary wing and pulling the rotary wing by action of the tether, being pulled by the motor. The electrical generator may serve as the motor in some variations of this embodiment. The rotary wing may be raised into air or kept in the air by a lighter than air balloon.

Another embodiment of the invention is a wind energy conversion system, comprising: an airborne rotary wing, adapted to harvest wind energy; an electrical generator on the ground, comprising a rotor and a stator; a rotational element on the ground, rotationally coupled to the rotor of the generator; and a tether, coupled to the airborne rotary wing and to the rotational element on the ground.

Another embodiment of the invention is a wind energy conversion system, comprising: an asymmetrical airborne wing, adapted to harvest wind energy; an electrical generator on the ground, comprising a rotor and a stator; a rotational element on the ground, rotationally coupled to the rotor of the generator; and a tether, coupled to the airborne rotary wing and to the rotational element on the ground; wherein the wing moves in a trajectory in which one of the wing tips makes larger distance and the wing is thicker and wider toward that tip.

Another embodiment of the invention is a wind energy conversion system, comprising: an asymmetrical airborne wing, adapted to harvest wind energy; an electrical generator on the ground, comprising a rotor and a stator; a rotational element on the ground, rotationally coupled to the rotor of the generator; and a tether, coupled to the airborne rotary wing and to the rotational element on the ground; wherein the wing moves in a trajectory in which one of the wing tips makes smaller distance and the wing is thinner or narrower toward that tip.

Another embodiment of the invention is a method of launching a pair of tethered airborne wings in an airborne wind energy conversion system, comprising steps of: connecting the wings to a rigid hub so that the connected wings resemble a rotary wing; letting the connected wings to rotate in the wind; letting the rotating connected wings to raise in the air under the wind force; disconnecting the wings from the hub; letting the wings to move individually.

This description uses prior patent applications by the inventor: WO 2013085800, PCT/US13/73766, PCT/US13/77886.

All referenced patents, patent applications and other publications are incorporated herein by reference, except that in case of any conflicting term definitions or meanings the meaning or the definition of the term from this disclosure applies.

BRIEF DESCRIPTION OF THE DRAWINGS

The accompanying drawings illustrate the invention. The illustrations omit details not necessary for understanding of the invention, or obvious to one skilled in the art, and show parts out of proportion for clarity. In such drawings.

DETAILED DESCRIPTION OF THE PREFERRED EMBODIMENTS

Figure 1:
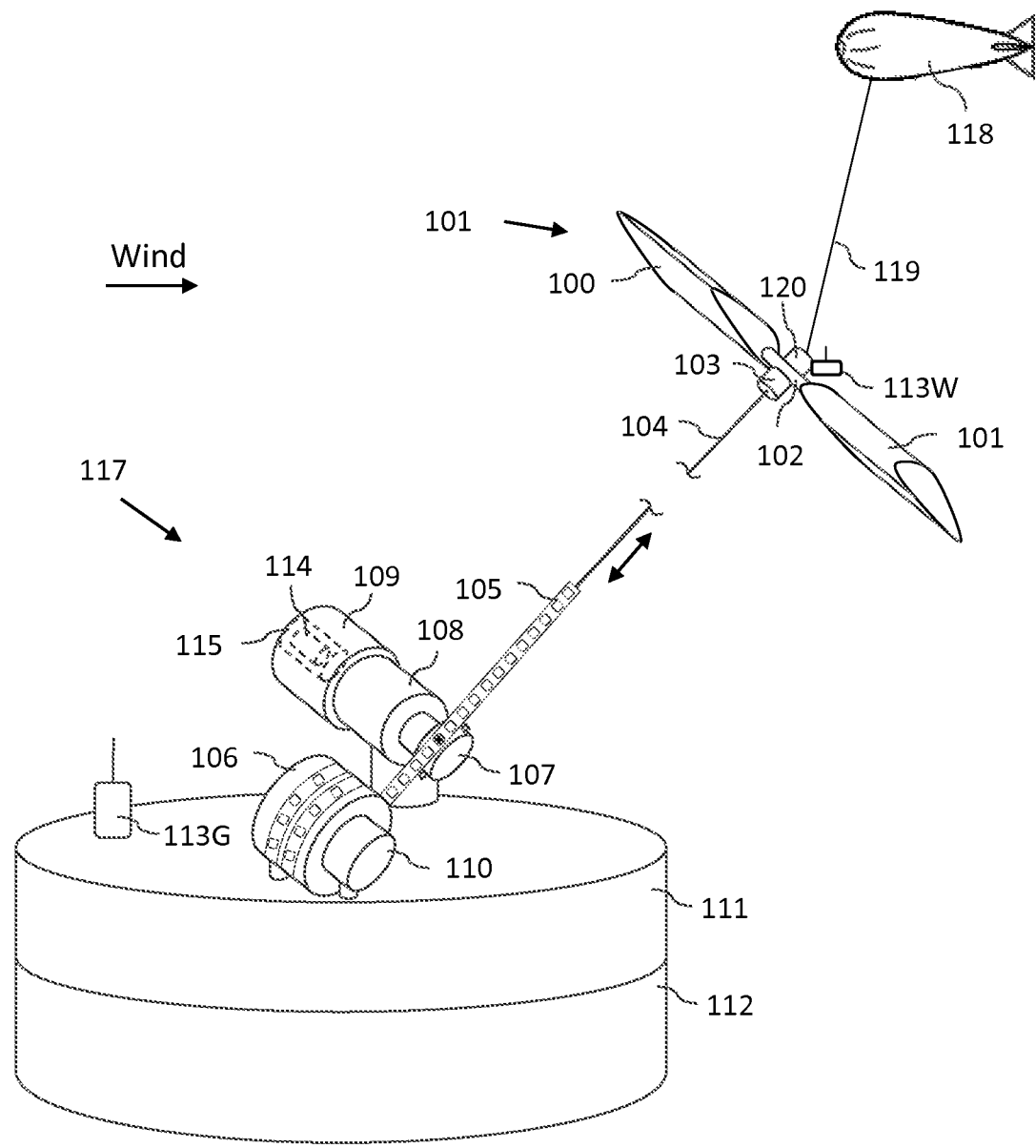
FIG. 1 shows a perspective view of one embodiment of the invention with a rotary wing and a lighter than air balloon

FIG. 1 shows some details of one embodiment of the invention. It comprises a rotary wing 101, rotating in the air under power of wind. Rotary wing 101 comprises two or more airfoil blades 100, connected in a hub (or a bridge) 102, which is attached to the top of an anti-twist device 103. The top end of a tether 104 is attached to the bottom of anti-twist device 103. The top and bottom parts of anti-twist device 103 can rotate on ball bearings relative each other with little friction. A perforated belt 105 is attached to the bottom end of tether 104. Perforated belt 105 winds on/unwinds from a spool 106. In the working phase, perforated belt 105 engages sprocket 107. Sprocket 107 is rotationally coupled to a rotor 114 of an electrical generator 109 via a gearbox 108. An electrical motor 110 is attached to spool 106. These elements are placed on a platform 111, which can rotate on ball bearings on a foundation 112, following changes in the direction of the wind. Platform 111 can be enclosed. The system is equipped with a computer based control system, which comprises a ground part 113G and a wing part 113W. Electrical generator 109 has a stator 115. A chain can be used instead of perforated belt 105. Platform 111 with all parts installed on it will be called a ground station 117. There is a lighter than air balloon 118. Rotary wing 101 is attached to balloon 118 by a cable 119, which is attached to another anti twist device 120 at wing 101. Balloon 118 can be filled with hydrogen, helium or hot air. Balloon 118 has sufficient buoyancy to raise wing 101, cable 119 and tether 104 into the air. Balloon 118 may be round or have a streamlined form for lower drag. In this embodiment, tether 104 is designed to resist much larger tension than cable 119. Consequently, cable 119 may be much thinner than tether 104. The control system controls rotary wing 101 by changing pitch of individual airfoils 100 as will be explained in more details below.

Rotary wing 101 rotates in a plane, inclined toward vertical, typically at the angle between 15° and 45°. Angles in the range 0° to 15° are also possible in some conditions (low wind etc.) Rotary wing 101 stays downwind from ground station 117. The rotation is caused by the pressure of the wind, like rotation of the conventional wind turbine. The power removal is performed by reel out of belt 105, pulled by tether 104. More specifically, the system operates in cycles, under command of the control system. One cycles typically takes from seconds to minutes. A cycle consists of a working phase and a returning phase. In the working phase, rotary wing 101 flies away from ground station 117 in approximately straight line. Airfoils 100 have low angle of attack, ensuring large lift and high lift-to-drag ratio. The rotational plane is defined by the motion of the centers of blades 100. The chords of airfoils 100 have low angle to the rotational plane. The system may keep angle of attack of the blades constant through the rotational circle by varying the blade pitch. Linear motion of rotary wing 101 pulls tether 104, tether 104 pulls perforated belt 105, perforated belt 105 rotates sprocket 107, which ultimately rotates the rotor of electrical generator 109. The linear speed of rotary wing 101 in this phase is between ¼ and ⅔ of the wind speed. The wind also pushes balloon 118, so that cable 119 remains tense. The working phase ends when almost all perforated belt 105 is unwound off spool 106. The returning phase starts. In the returning phase, perforated belt 105 is lifted off sprocket 107, or sprocket 107 disengages rotor 114 of electrical generator 109. Electrical motor 110 rotates spool 106 in the opposite direction, winding perforated belt 105 back on spool 106. Perforated belt 105 pulls tether 104, which pulls rotary wing 101 and balloon 118 toward the ground station 117. At the start of the returning phase, the control system directs blades 100 to pitch, achieving high angle between the wing chords and the rotational plane. Thus, the resistance created by rotary wing 101 moving back toward the ground station is minimized. The amount of the energy, expended in the returning phase, is preferably only a small fraction of the amount of the energy, harvested and converted to electricity in the working phase. The linear speed of rotary wing 101 in the returning phase is at least the same as in the working phase. When rotary wing 101 is close to its original position, the returning phase ends and a new cycle starts.

Airfoil blades 100 can be of rigid, soft or mixed construction. (The rigid blades can flex to small extent, like wings of planes and gliders or blades of wind turbines.) Examples of soft blade designs are leading edge inflatable and ram air inflatable. Mixed blade designs may have soft segments (like leading edge inflatable) close to the center and rigid segments close to the tips, where rigid wings with higher L/D can benefit from larger relative air speed. To some degree, the huge body of knowledge related to construction and control of rotors conventional horizontal axis wind turbines can be applied to rotary wing 101 with rigid blades.

Figure 2A:
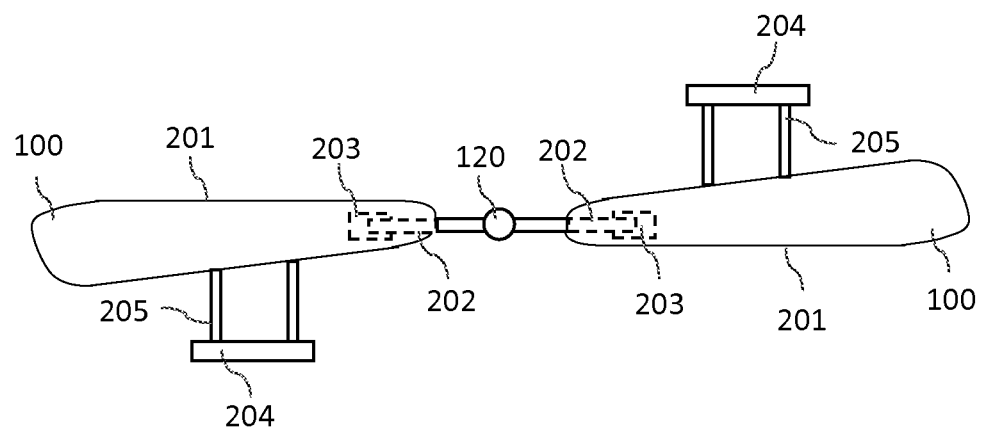
FIG. 2A shows a top view of a rotary wing with rigid blades
Figure 2B:
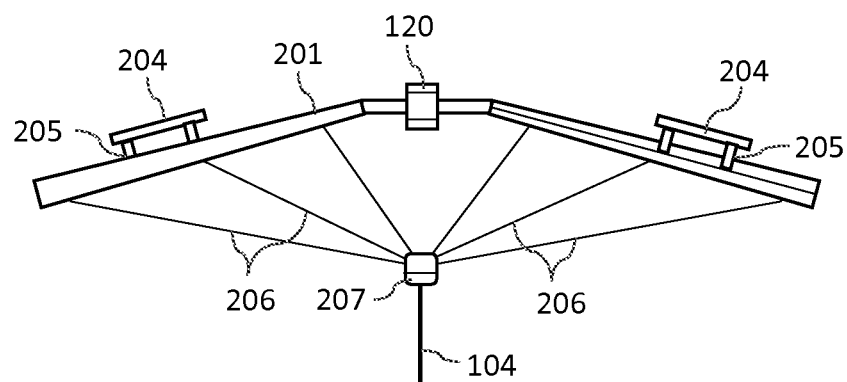
FIG. 2B shows a front view of a rotary wing with rigid blades

FIG. 2A and FIG. 2B show rotary wing 101 with rigid blades 100. FIG. 2A is a view from the wing top and FIG. 2B is a view from a wing front (which is the same as its back). These figures show a slightly different variation of rotary wing 101. In this variation, blades 100 are not in the same plane as in FIG. 1, but are placed on respective axles 202 at angle to each other. The leading edges of blades 100 are marked by number 201. Each blade 100 can rotate relative to its axis 202. There are two types of actuators to accomplish the rotation (and thus change the angle of blade 100 to the rotational plane, angle of attack, lift and drag). The first type is a furling drive 203, typically used for HAWT blade pitch control. The second type is an elevator 204 on a double boom 205, comprising a small airfoil. Like an elevator in an aircraft empennage, elevator 204 is rotated on orders of the control system, changing the angle of blade 100 to the rotational plane. One of these actuator types can be omitted. FIG. 2B shows also suspension cables 206, which allow to make rotary wing 101 lighter by spreading the load over the whole blade span (as opposite to resisting the load only at the blade root). Suspension cables 206 are attached to the top part of an anti-twist device 207. Tether 104 is attached to the bottom part of this device, which can rotate freely relative to the top part. Preferably, most of the aerodynamic lift is resisted by cables 206 in the nominal conditions of power generation. Preferably, thickness and chord of the blade gradually increase toward the external tips of the blades, possibly except for the small section immediately at the tip.

The device, described above, has all or most of the advantages of an airborne wind energy system of non-rotating type, plus it is easy to launch and land, plus it is much easier to control than other types of airborne wind energy systems. The system is launched by letting balloon 118 free. When the system is launched, rotary wing is fully furled—blades 100 are turned parallel to the axis of anti-twist device 103 with their leading edges 201 pointing into the same or close directions. When balloon 118 raises and pools rotary wing 101 to a pre-defined altitude, belt 105 is fixed at ground station 117. Rotary wing 101 is unfurled (leading edges 201 point into nearly opposite directions, chords are at small angle to the rotational plane) and is allowed to rotate. When rotary wing 101 starts rotating, it becomes controllable. When the rotation stabilizes (with the help of control inputs from the control system), belt 105 is released and the operational cycles start. The system can operate even in very weak winds, because wind is not required for the system to remain airborne. Balloon 118 is relatively small and inexpensive because it does not have to carry a generator or resist wind forces acting on the airborne rotor. Wind force, acting on rotary wing 101 and power production are controlled by pitching blades 100. Rotation of rotary wing 101 can be stopped quickly in strong winds by pitching all blades into a position where they create small negative lift; when rotation stops, turning them into position, where they create zero lift. The control system is supposed to maintain such position dynamically for each blade. Thus, the rotation is stopped by the control system when the wind becomes too strong. When it is time bring the system to the ground (possibly once in many months for maintenance), the control system stops rotation, then tether 104 is pulled, until rotary wing 101 is on the ground, then cable 119 is pulled until balloon 118 is on the ground. Another advantage is absence of the tether drag, because tether 104 does not move significantly sideways.

Compared with horizontal axis wind turbine, the above described device does not need a tower or a nacelle, uses lighter and less expensive blades, and has much lower construction costs. Thus, it has lower cost per kW and per kWh of electricity.

Figure 3A:
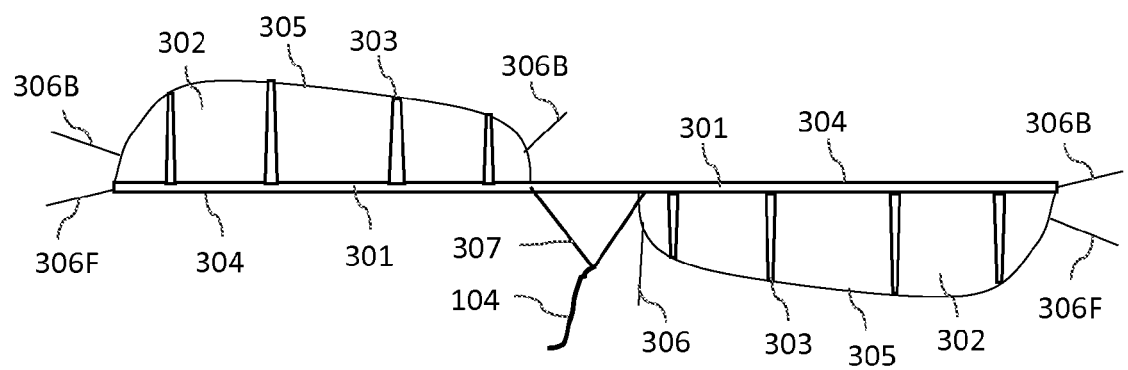
FIG. 3A shows a top view of a rotary wing with soft blades
Figure 3B:
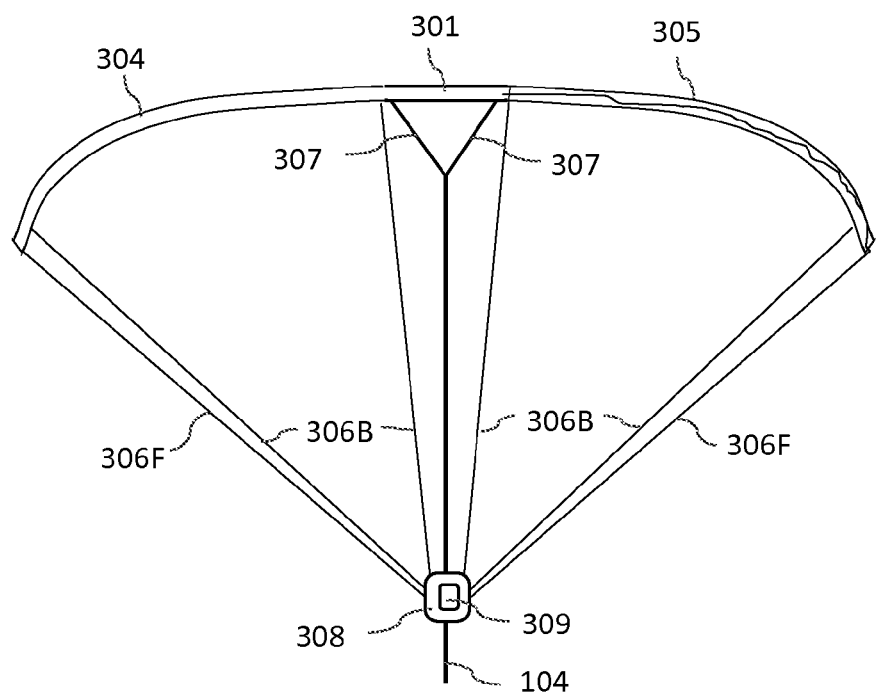
FIG. 3B shows a front view of a rotary wing with soft blades

Another variation of the rotary wing is a soft rotary wing, shown in FIG. 3A (bottom projection) and FIG. 3B (front projection). This variation is based on a leading edge inflatable (LEI) kite. The wing is based, in principle, on the idea of two kites, connected in a way that they face in the opposite directions. The wing comprises an inflatable tube 301, shared by both kites (blades). Each kite has a fabric canopy 302, a plurality of inflatable struts 303, a front line 306F and two back lines 306B. Inflatable tube 301 serves as a front edge 304 and the back edge of canopy 302 is a trailing edge 305 of the kite. Two lines 307 attach tether 104 near internal tips of the kites. Lines 306F and 306B end in a pod 308, placed lower on tether 104, which contains elements of a kite control unit (KCU) 309. These elements comprise at least mechanical actuators that pull in or let out lines 306F and 306 B in response to commands of the central processor of the control system. Pod 308 can also carry sensors and processing unit(s) of the wing part 113W of the control system. Other suitable places for at least GPS sensor is center of inflatable strut 301, centers of individual kites and tips of the wing. Thickness of inflatable tube 301 and chord length of canopy 302 gradually decrease from defined points at or close to the internal tip of the blade toward the external tips of the blade. Thus, the thickness and chord length of the airfoil of each blade decrease toward the external tips, starting at least at the distance of ⅓ of the blade span from the internal tip of the blade. This is in order to accommodate increasing air speed toward the external tips of the blades. Optionally, leading edge 304 may be supported by a bridle.

In the working phase, individual kites form airfoils with small angle attack, ensuring high lift and low drag. In the returning phase, one of the following maneuvers is performed: a) back lines 306B are relaxed, almost eliminating lift and significantly reducing drag in the rotation; b) external lines 306B and 306F are let out, almost eliminating both lift and drag. After that, tether 104 is pulled by electrical motor 110 with small expenditure of energy.

Figure 4:
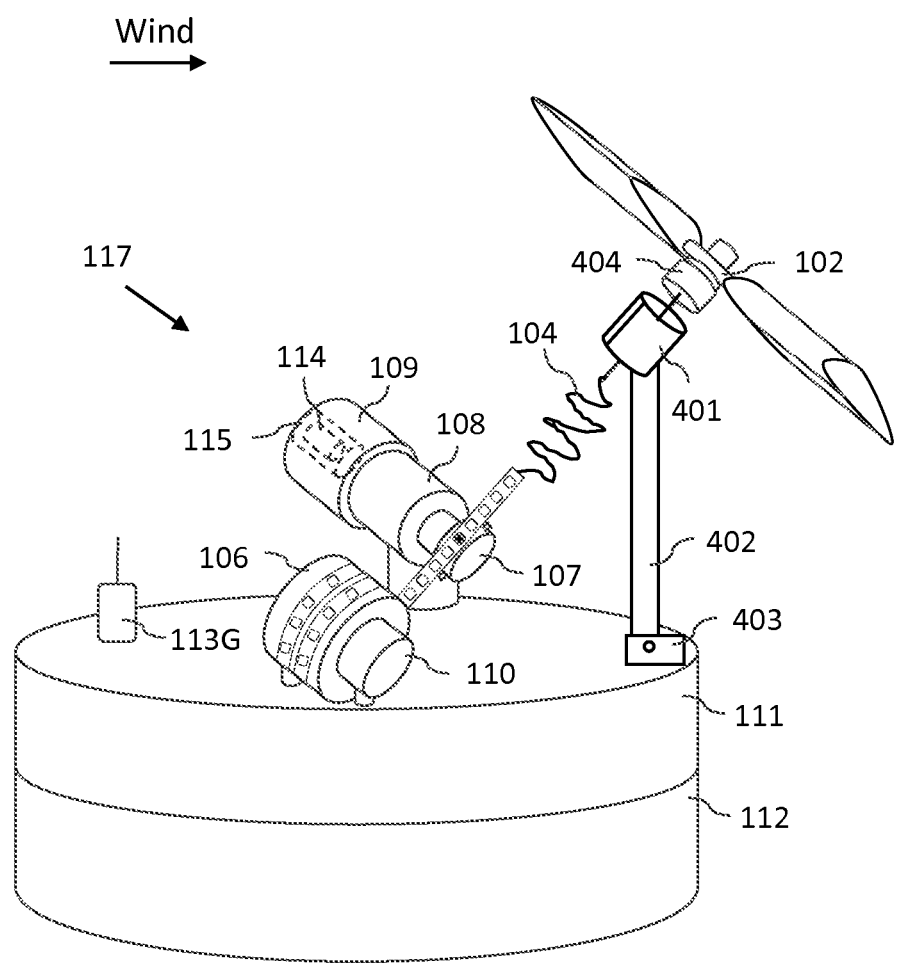
FIG. 4 shows a perspective view of another embodiment of the invention with a launching perch for the rotary wing
Figure 5:
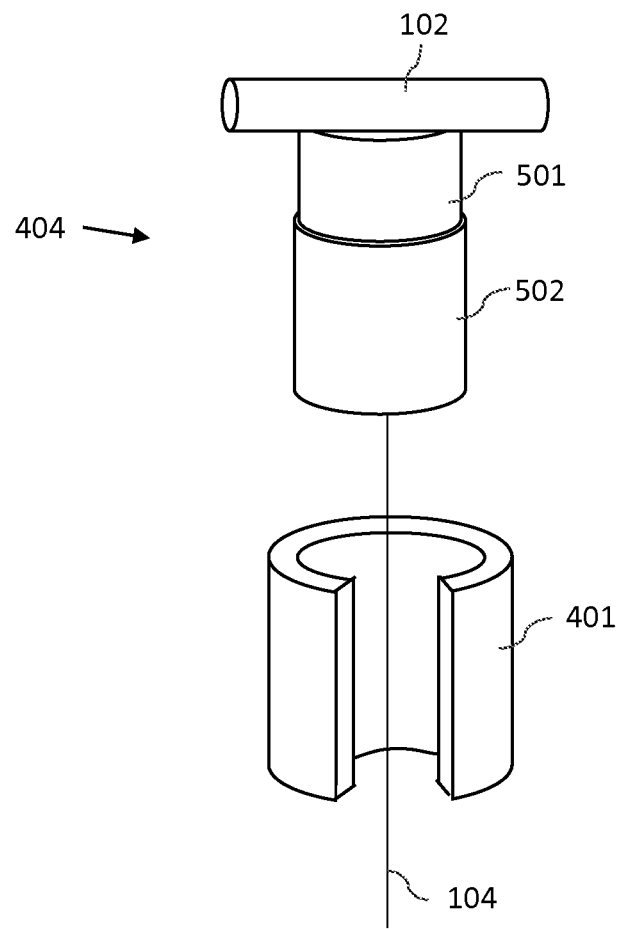
FIG. 5 shows details of the launching perch.

In another embodiment, balloon 118 is not used. In order to launch and land rotary wing 101, a perch on the ground platform is used, as shown on FIG. 4. The perch comprises a wing nest 401, installed on a tubular bar 402, which can be folded using a folding mechanism 403. Further details are shown in FIG. 5. In this embodiment, rotary wing 101 has a nesting mechanism 404, comprising a fixed (to the wing) top part 501 and a cylindrical bottom part 502, rotating relative to top part 501 on roller bearings. There is a brake 503, which can slow down and stop rotation of bottom part 502 relative to top part 501. Nest 401 has a form of a cylinder ring with internal diameter slightly larger than internal diameter of bottom part 502, with a cutout, allowing passage of tether 104. Alternatively, both details 401 and 502 can have matching conical shapes. Nest 401 is inclined to vertical. To launch, rotary wing 101 is placed into nest 401, platform 111 rotates to point nest 401 downwind. Under the pressure of wind, wing 101 starts rotating. The control system continuously pitches blades 100 to ensure optimal lift/drag ratio. At certain rotational speed, the lift force along the axis of rotation exceeds weight of rotary wing 101 and friction of bottom part 502 against nest 401, and rotary wing 101 takes off. Tether 104 passes through cutout in nest 401. Rod 402 is folded to get nest 401 out of the way of tether 104. Rotary wing 101 continues to accelerate and rise. At certain point, it enters a power generation cycle and continues generating power, possibly for weeks and months. The landing procedure is performed in the opposite order. In the end of a power generation cycle, motor 110 continues pulling belt 105 and tether 104. The perch is raised and tether 104 is brought into nest 401 through the cutout.

Bottom part 502 enters nest 401. The rotation of rotary wing 101 is slowed first by pitching blades 100 into high angle, then by applying brake 503 until rotation stops. Additionally, nest 401 can be equipped with a remotely controlled arrestor, which would prevent premature or accidental release of rotary wing 101.

The control system in the embodiments described above comprises at least one microprocessor, multiple sensors and actuators. Sensors may include day and night cameras; wing GPS, wing speed meter, accelerometers, anemometer, magnetometers and more. Wind speed at different altitudes can be measured with a lidar or a radar or a sodar or other means. The control system also ensures stability of the rotational and translational motion of rotary wing 101. See referred publications for more info on the control system and other aspects.

Tether 104 and cable 119 can be manufactured from ultra-high molecular weight polyethylene, para-aramids or another strong fiber. Blades 100 can be made of various materials, including carbon fiber, fiberglass, aramids, para-aramids, nylon, high or ultra-high molecular weight polyethylene and other.

In the device, described above, rotary wing 101 can fly at altitudes from 20 to 12,000 meters. The wing can have span from 1 meter to hundreds meters. Nominal power may vary from 10 kW to hundreds MW. The distance between blades 100 may be between 0 to 4 blade spans; in more preferable embodiments, the distance is 0.5-2 spans. Ground station 117 can be deployed on land or on a floating platform in the water.

It might be desirable to increase speed, with which belt 105 reels out in the working phase, in order to increase the angular speed of sprocket 107 and decrease the force and the torque, acting on it. For this purpose, a block and pulley mechanism to mechanical disadvantage from WO 2013085800, FIG. 4, is used with possible changes: the airborne sheave(s) are attached to rotary wing 101 and tether 104 slides in the sheaves.

A more common mechanism for transferring power from the tether to the rotor of the electrical generator in the airborne wind energy system does not employ the belt and the sprocket. Instead, the spool is rotationally coupled to the rotor of the generator through a gearbox. In the returning phase, the gearbox is shifted to the reverse, and the inertial rotation of the rotor reels the tether in. In more embodiments, an energy conversion mechanism, other than an electrical generator, is utilized. Such mechanism can comprise a gas pump or a water pump. The energy can be converted for use in industrial processes or for storage.

Alternatively, balloon 118 can also be built into hub 102. In addition, instead of using balloon 118 for buoyancy, the system can utilize flexible wings, inflated with lighter than air gas, such as hydrogen, helium or hot air. This works better with thick airfoils (average thickness of 0.5 meter or more). Multiple rotary wings can be connected to a single tether in different combination in co-axial or tandem combinations. Multiple tethers can attached a single rotary wing to the ground devices.

Figure 6:
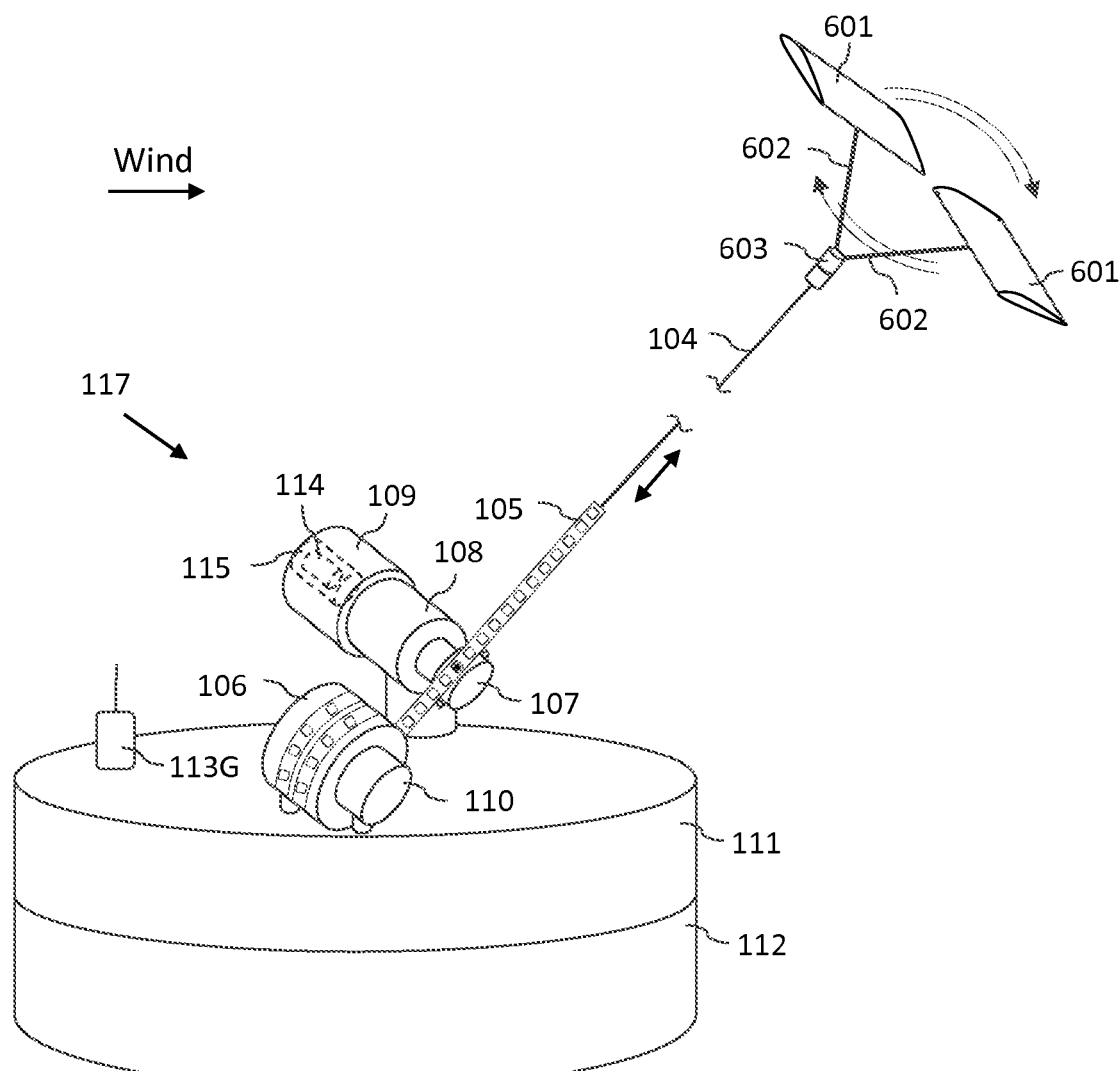
FIG. 6 shows a perspective view of another aspect of the invention with two fixed (non-rotary) wings in a circular motion.
Figure 7:
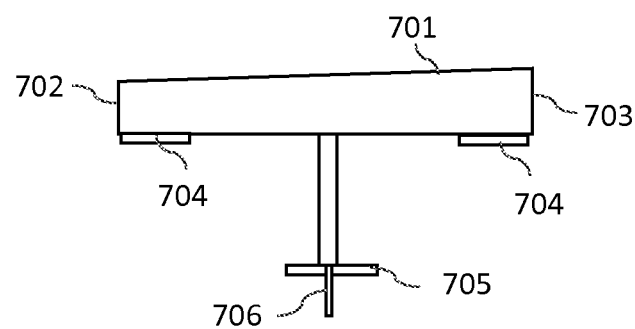
FIG. 7 shows schematically the asymmetrical wing from this embodiment.

In another embodiment and aspect of the invention, shown in FIG. 6, one or two wings 601, harvesting wind energy, move in a circle. They are attached by individual tethers 602 to the top part of an anti-twist device 603. Tether 104 is attached to the bottom part of anti-twist device 603. Wing 601 widens and thickens toward the end, further away from the center of the circle. Wing 601 is shown in FIG. 7. It comprises main airfoil 701, narrower and thinner at its left tip 702 (which moves in a circle of smaller diameter) and wider and thicker at its right tip 703 (which moves in a circle of larger diameter). It is also equipped with ailerons 704, elevators 705, a horizontal stabilizer and a rudder 706. Wing 601 can be rigid, flexible or soft. Such asymmetry of the wing allows more efficient wind energy harvesting, because the tip, further from the center of the circle, moves with higher speed.

In another embodiment, two wings 601 can be connected between them by a cable. Further, for easier launch two wings may be connected via a hub, composing together a composite rotary wing (each individual wing being a blade), and launched as a single rotary wing, as described above. After the composite rotary wing is launched, individual wings 601 separate and start moving in a circle, harvesting wind energy. When the wings need to land, they can be brought together and become the composite rotary wing again. This composite rotary wing is then landed as a rotary wing.

More embodiments are obtained by utilizing the devices, described above, to work in water current rather than in the wind. In such embodiments, the ground mechanisms can be placed on floating platforms, the rotary wing is adapted to work submerged in the water, balloon 118 is not used.

While above description contains many specificities, these should not be construed as limitations on the scope, but rather as exemplification of several embodiments thereof. Many other variations are possible and contemplated.

What is claimed is:

1. A wind energy conversion device, comprising:
   an airborne rotary wing, adapted to harvest wind energy;
   the rotary wing comprising at least two similar airfoil blades;
   a lighter than air balloon, coupled to or integral with the rotary wing in such a way as not to interfere with the rotation of the rotary wing;
   an electrical generator on the ground, comprising a rotor and a stator;
   a rotational element on the ground, rotationally coupled to the rotor of the generator;
   a belt, coupled to the rotary wing and engaging the rotational element on the ground;
   the belt adapted to transfer mechanical energy, harvested by the airborne rotary wing, to the rotational element;
   a spool on the ground, other than the rotational element, the spool adapted to allow at least a portion of the belt to wrap around it.

2. The device of claim 1, wherein the blades are spaced at some distance from the center of the rotary wing.

3. The device of claim 1, wherein at least one suspension line is attached to each blade and the second end of the suspension line is coupled to the belt.

4. A method of wind energy conversion, comprising steps of:
   raising a rotary wing, comprising plurality of airfoil blades, into the air;
   using the rotary wing to harvest wind energy;
   providing an electrical generator on the ground, comprising a rotor and a stator;
   providing a rotational element on the ground, rotationally coupled to the rotor of the generator;
   providing a motor on the ground, rotationally coupled to the rotational element;
   providing a tether, coupled to the rotary wing and to the rotational element;
   providing a spool on the ground, other than the rotational element;

unwinding at least a portion of the tether off the spool, when the tether is being pulled by the rotary wing;

winding at least a portion of the tether onto the spool, when the tether is being pulled by the motor; and alternatively transferring energy from the rotary wing to the electrical generator by action of the tether, being pulled by the rotary wing and pulling the rotary wing by action of the tether, being pulled by the motor.

5. The method of claim 4, wherein the rotary wing is raised into the air or kept in the air by a lighter than air balloon.

* * * * *